2,899,329
SOIL STABILIZATION

John W. Lyons, Reading, Mass., assignor to Monsanto Chemical Company, St. Louis, Mo., a corporation of Delaware No Drawing. Application March 29, 1957
Serial No. 649,284

11 Claims. (Cl. 106—287)

This invention relates to novel improved procedures for the stabilization of soils and to the novel soil compositions prepared thereby. More specifically this invention relates to an improved procedure for substantially improving the structural properties of clay soils whereby the said soils are treated with a minor amount of phosphoric acid such that they can be employed as a suitable base material for various construction projects.

Soils containing substantial quantities of clay are presenting an ever increasing problem to construction engineers, especially in the building of modern highways and the construction of airfields capable of adequately handling present heavy aircraft. It is well known that clay soils may have a high compressive strength when dry but that generally they have substantially no strength when wet. Accordingly, past practice initially largely avoided the problem by laying out highways and airfields in areas that did not possess problem soils and when it became necessary to go into these areas the practice generally required hauling in gravel and crushed stone in substantial quantities to provide a suitable subgrade. The present and foreseeable future materially increased wheel loads of truck transports and aircraft; the increasing unavailability of select sites having suitable construction and foundation soils particularly in the more populated areas, excluding the prohibitively expensive procedures of taking occupied land; the fact that modern highways are designed to provide the shortest reasonable distance between the principal cities such that they no longer can entirely circumvent the areas of problem soils; and the dwindling supply of economically available granular soils, crushed stone and gravel in many areas, when considered in the light of the vast construction program which is planned clearly indicate the seriousness of this problem.

Various chemicals have been suggested and employed for the purpose of improving the bearing load of soils, for example Portland cement, lime, calcium chloride, sodium silicate, various bituminous materials, aniline-furfural resins, calcium acrylate resins, and the like. Normally the chemicals are added in relatively large amounts, thus the various inorganic materials frequently require the addition of 10 percent or more, based on the dry weight of the soil. Whereas Portland cement probably has been used more widely and with greater success than any other soil stabilization material and is usually employed at from about 10 to about 15 percent by weight of the dry soil, it is not recommended for highly plastic soils. Thus, soils having a plastic index of more than aobut 16 to 18, wherein the plastic index expresses the range of moisture content over which the soil is plastic and is defined as the moisture content at the liquid limit minus the moisture content at the lower plastic limit, are generally not satisfactorily stabilized in the field with cement.

The principal object of this invention is to provide a means of substantially improving the wet structural strength of clay-containing soils. Another object of this invention is to treat clay-containing soils having a plastic index of greater than about 15 to provide a soil composition suitable as subgrade for the construction of highways, airfields, and the like. Still another object of this invention is to provide an economical process which is adapted to rapid construction procedures in civilian and military service. Other objects will be apparent from the following disclosure.

It has now been found that the addition of from about 1 to about 5 percent and preferably from about 2 to about 3 percent of phosphoric acid to clay-containing soils effects a material improvement in the wet compressive strength of the soil and with suitable working procedures provides a subgrade soil which is satisfactory for the support of highway construction, airfield construction and the like. It has further been found that the orthophosphoric acid produced by the wet-process, wherein alkylation sulfuric acid is employed in the treatment of the phosphate rock, has a further unexpected advantage in that it effects a significantly higher early wet compressive strength to treated clay soils and the ultimate strength is reached sooner, as hereinafter more fully described, and is the preferred embodiment of the instant invention. It is understood that the various phosphoric acid equivalents such as phosphoric pentoxide, pyrophosphoric acid, metaphosphoric acid, tetraphosphoric acid, other polyphosphoric acids, and mixtures thereof can be employed in this invention as the source of the orthophosphoric acid.

The clay-containing soils which may be benefited by the phosphoric acid treatment preferably includes those soil compositions containing from about 10 to about 70 percent clay, and more preferably still from about 20 to about 50 percent clay in accordance with the well known triaxial textural classification chart of the U.S. Bureau of Chemistry and Soils. These soils include the various soils classified as clay, sandy clay, silty clay, clay loam, sandy clay loam, and silty clay loam. Various illustrative specific clay-containing soils are for example clay from the Hybla Valley, Virginia, Cecil clay, Houston clay, Lake Charles clay, Capay silty clay loam, and the like.

The phosphoric acid treatment of the clay-containing soil can be readily effected by the addition of a calculated amount, depending on the depth of soil treated and the moisture content of said soil, of phosphoric acid by spray application by a P and H single-pass soil stabilizer, Seaman Pulvi-mixer, or similar apparatus, or by application of the phosphoric acid and water by other suitable means and mixing with various traveling pug mills, rototillers and the like. To provide the optimum moisture content to the treated soil the phosphoric acid can be diluted to any suitable concentration. Thus, the phosphoric acid can be diluted in suitable storage tanks at the construction site; can be partially diluted to a desired concentration and subsequently further diluted just prior to application to the soil, for example where two traveling tanks are employed and the concentration of the acid is controlled by independent regulating valves into a distribution system whereby the final ratio of phosphoric acid and water can be readily controlled as necessary; or the water and phosphoric acid can be added to the soil from separate independently controlled spray systems; and other suitable procedures as will be apparent to those skilled in the art. The treatment of the soil with an aqueous system also provides the further advantage of effecting a more uniform distribution of the phosphoric acid in the soil for a given degree of mixing in contradistinction to the prior art systems which require the initial intimate distribution of solid material therein. Normally it is desirable to treat the soil to a compacted depth of at least about 6 inches to provide a well stabilized subgrade. After the treatment of the clay-containing soil with the desired amount of phosphoric acid it is compacted by the application of a sheep's-foot roller and thereafter leveled and further compacted by pneumatic-tired rollers and then with smooth rollers if desired. Thereafter the treated soil is generally covered with a light coating of bituminous material by spray application or other suitable means to prevent substantial loss of moisture therefrom during curing. Then a suitable subbase and topping can be applied thereover or the topping can be applied directly to the stabilized subgrade as desired. When the combination of subbase and topping is applied the use of this invention to provide a stabilized subgrade effects a substantial saving in the quantity of subbase material which might otherwise be required, for example in one application calling for a 22-inch subbase, based on the California bearing ratio procedure, the preparation of a subgrade in accordance with this invention enables the reduction of the subbase to 6 inches or less.

It is generally recognized that a stabilized soil preferably should exhibit an unconfined compressive strength of at least about 100 pounds per square inch after immersion of the compacted soil in water for a time of two days and that a stabilized soil preferably should not expand, after immersion, by more than about 2.5 percent of its initial compacted volume.

The molded 2-inch by 4-inch cylindrical samples for the unconfined compressive strength evaluation were prepared with a Vicksburg compactor, which device was developed by the U.S. Waterways Experiment Station, Vicksburg, Mississippi, and modified as hereinafter described. The apparatus consists of a compaction hammer, compaction mold, base plate, and an Ames dial supported on a tripod. The hammer is a four-pound weight which slides freely on a steel rod between an upper handle and a compaction four-pound hammer falling through a vertical distance of twelve inches. After the first five blows on the first layer, foot at the bottom. The space between handle and foot is such that the hammer has a free fall of exactly twelve inches. The compaction foot has a flat circular face with a diameter just slightly less than the inside diameter of the mold. The mold is about six inches in height and exactly two inches in inside diameter. Two "ears" are welded to the outside which fit over upright posts on the base plate. The base plate has a short piston fastened to it which projects upward about ¾ inch into the mold. After several blows were delivered to the soil in the mold a small wedge was removed so that the mold rides free supported by the friction of the compacted soil against the walls of the mold. With succeeding hammer blows a compactive effort is exerted by the lower piston on which the soil is resting. After compaction the tripod and Ames dial were placed in position so that an extension from the dial rests on top of the soil in the mold. Height can then be read to 0.001 inch on the dial indicator. To remove the compacted sample a 10-ton capacity Carver press was equipped with a collar which just clears the compaction mold of the Vicksburg compactor but does not clear the "ears" on the mold. By means of this collar and a ram which just fits inside of the mold, samples were readily ejected after compaction.

The molded samples mentioned in the examples given below were prepared using the above-described Vicksburg compactor in the following manner, unless otherwise specified. The desired mixture of soil, water and phosphoric acid was prepared and the necessary quantity thereof to provide compact specimens about 4±0.1 inches in height was weighed out and compacted in four roughly equal layers, each layer receiving twelve blows from the the metal wedge under the mold was removed, thus allowing the piston in the base plate to exert a compactive effort on the bottom of the soil with each succeeding blow. Another portion of the soil mixture was employed to determine the moisture content of the sample (total volatiles at 110° C. for 16 hours). The compacted sample was then ejected and cured at about 68 to about 70° F. and about 100 percent relative humidity for five days and then immersed in water at about 68 to 70° F. for a period of two days.

The unconfined compressive strength was determined using an electrically driven AP-170 stability compression testing machine wherein the loading rate was 0.25 inch per minute. A brass plate exactly two inches in diameter was placed on the top of the soil specimens, a ball bearing placed in a depression in the upper surface of the plate and the machine put into operation. The load was uniformly applied and the maximum stress before failure of the test sample, measured in pounds per square inch, was noted.

The method of determining volume change was essentially that procedure published in Procedures for Testing Soils, ASTM Committee D–18 (July 1950), pp. 131–135, as submitted by the Bureau of Public Roads. It was found that when a clay soil was treated with 2 and 3 percent of orthophosphoric acid at soil moisture contents of from about 16 to about 20 percent at the time of compaction and the molded samples were cured at about 70° F. and 100 percent relative humidity for one day prior to immersion, that the percent volume change after soaking in water for 140 hours varied from 0.6 to 1.5. These values indicate that the clay-phosphoric acid compositions are well below the maximum permissible expansion limit set out hereinabove.

The clay from the Hybla Valley in Virginia used for many of the following experiments is composed of about 33 percent clay, 24 percent silt, and 43 percent sand. This clay was found to have a plastic index of about 24, an optimum moisture content for compaction of about 15 percent, a maximum dry density of about 117 pounds per cubic foot, the volume change when saturated was 9.2 percent, and the unconfined compressive strength after 5 days cure at about 68 to 70° C. and about 100% relative humidity and 2 days of soaking in water ranged from about 0 to about 4 pounds per square inch The following examples are illustrative of the instant invention.

*Example 1*

A series of unconfined compressive strength test samples was prepared by placing a quantity of clay soil into a mixer and mixing varying amounts of phosphoric acid, based on 100% $H_3PO_4$ and the weight of the dry soil, and water thereto. The molded test samples were cured for 5 days and then immersed in water for 2 days prior to the determination of their unconfined compressive strength, the results of which are given in the following table:

| Sample | Percent Water in Molded Soil | Dry Density, lbs./ft.³ | Unconfined Compressive Strength, p.s.i. |
|---|---|---|---|
| Control | 10-20 | 100-117 | 0-4 |
| Do | 16 | 116.1 | 2 |
| 1% Phosphoric acid | 16.7 | 114.0 | 68 |
| Do | 18.0 | 111.9 | 75 |
| Do | 19.2 | 108.9 | 62 |
| 2% Phosphoric acid | 15.3 | 117.2 | 127 |
| Do | 16.3 | 114.9 | 113 |
| Do | 17.8 | 111.8 | 98 |
| 3% Phosphoric acid | 15.5 | 115.4 | 156 |
| Do | 16.9 | 113.4 | 140 |

The above data indicates that phosphoric acid is an effective agent for the improvement of the compressive strength of clay soils. It is also of interest to note that as the quantity of phosphoric acid is increased the greater compressive strengths are obtained at progressively lower water content of the soil at the time of compaction.

*Example 2*

The effect of various soil stabilization materials on clay from the Hybla Valley is shown in the following comparative experiments, wherein the test samples are cured for five days and then immersed in water for two days prior to the determination of the unconfined compressive strength tests.

| Sample | Percent Water in Molded Soil | Dry Density, lbs./ft.³ | Unconfined Compressive Strength, p.s.i. |
|---|---|---|---|
| Control | 16.0 | 116.1 | 2 |
| 10% Lime | 15.4 | 101.8 | 50 |
| Do | 17.4 | 102.8 | 72 |
| Do | 19.7 | 104.2 | 88 |
| Do | 22 | 102.4 | 87 |
| 9% Portland cement | 14.5 | 108.8 | 118 |
| 12% Portland cement | 15.1 | 107.8 | 282 |
| 2% Phosphoric acid | 15.6 | 115.5 | 131 |
| 2.75% Phosphoric acid | 14.6 | 116.8 | 163 |

From the above data it is apparent that the treatment of the clay soil with 2 percent phosphoric acid is more effective than treatment with 10 percent lime or 9 percent cement, and is only surpassed by the use of 12 percent of cement.

Example 3

The phosphoric-acid-treated clay soil continues to gain strength over a substantial period of time as demonstrated by the instant series of experiments. All samples were prepared in the same manner such that the only variable was the time of cure of the molded specimen. Each of the samples was prepared by introducing 418 gm. (equivalent to 400 gm. oven dry soil, 110° C. for 16 hours) of clay from the Hybla Valley, lot 2, into the mixer and adding thereto 9.4 gm. of 85% phosphoric acid (8.0 gm. 100% $H_3PO_4$, i.e. 2% by weight of the dry soil) and 48.1 gm. of distilled water, mixing for 5 minutes and after about 15 minutes molding the samples for unconfined compressive strength tests. The molded samples were stored at about 70° F. and at 100 percent relative humidity to cure for the desired length of time, then two samples were selected at random and immersed in water at 68 to 70° F. for two days prior to the determination of the unconfined compressive strengths. The evaluation results are given in the following table, wherein the data are the average of two samples:

| Sample | Percent Water in Molded Soil | Dry Density, lbs./ft.³ | Unconfined Compressive Strength, p.s.i. |
|---|---|---|---|
| Control (no Phosphoric acid) | 16.0 | 116.1 | 2 |
| 7 Days' cure | 15.7 | 115.5 | 139 |
| 14 Days' cure | 15.6 | 116.0 | 174 |
| 29 Days' cure | 15.5 | 115.8 | 198 |
| 55 Days' cure | 15.6 | 115.5 | 206 |

From the above data it is seen that the compressive strength of the treated soil continues to increase for a substantial period of time of at least about one month wherein significant increments of additional compressive strength are effected, but lesser additional compressive strength is effected even in the second month of cure.

Example 4

To demonstrate the superiority of the wet-process phosphoric acid which is prepared by the use of alkylation sulfuric acid instead of virgin sulfuric acid on the phosphate rock the following series of test samples was prepared and evaluated. A 437-gm. sample of air dry (equivalent to 420 gm. oven dry soil, 110° C. for 16 hours) clay from the Hybla Valley, lot 3, was introduced to the mixer and a solution containing 8.4 gm. of 100% $H_3PO_4$, i.e. 2 percent by weight of the dry soil, and 73 gm. of water was introduced thereto and mixing continued for about 5 minutes. After about 15 minutes the samples of the treated soil were molded for the unconfined compressive strength tests. The phosphoric acids employed in this series of experiments were selected as follows: (1) analytical reagent grade phosphoric acid, (2) wet-process phosphoric acid produced by the reaction of virgin sulfuric acid on phosphate rock, and (3) wet-process phosphoric acid produced by the reaction of alkylation sulfuric acid on phosphate rock, wherein the phosphate rock employed in both (2) and (3) was from the same lot of material. The molded samples were cured for two weeks at room temperature, and then immersed in water for two days at 68 to 70° F. prior to the determination of the unconfined compressive strength. A fourth set of duplicate samples was prepared as (3) above, but wherein the solution contained only 64.6 gm. of water and twenty-four blows from the compaction hammer were employed. The evaluation results are given in the following table, wherein the data are the average of two duplicate samples.

| Sample | Percent Water in Molded Soil | Dry Density, lbs./ft.³ | Unconfined Compressive Strength, p.s.i. |
|---|---|---|---|
| Control | 15.8 | 115.2 | Slaked |
| (1) 2% Reagent grade $H_3PO_4$ | 15.9 | 114.8 | 130 |
| (2) 2% Wet process $H_3PO_4$ (Virgin) | 15.9 | 114.3 | 135 |
| (3) 2% Wet process $H_3PO_4$ (Alkylation) | 15.6 | 114.6 | 169 |
| (4) 2% Wet process $H_3PO_4$ (alkylation) | 13.9 | 121.5 | 241 |

From the above results it is seen that reagent grade and wet-process phosphoric acid, produced from virgin sulfuric acid, provide substantially equivalent compressive strengths but that the use of wet-process phosphoric acid produced by the use of alkylation sulfuric acid provides an unexpected and substantially improved result.

Example 5

A series of samples was prepared for unconfined compressive strength tests wherein 24 blows instead of the standard 12 blows was employed to determine whether it was possible to effect any substantial increased compaction of the treated soil. Each of the samples was prepared by the addition of 2 percent of phosphoric acid, based on the weight of 100% $H_3PO_4$ and the weight of oven dry soil, to the clay from the Hybla Valley, lot 2, at varying moisture contents as indicated below. The molded samples were cured for 5 days at room temperature, then immersed in water at about 68–70° F. for 2 days prior to the determination of the unconfined compressive strengths. The evaluation results are summarized in the following table.

| Sample | Percent Water in Molded Soil | Dry Density, lbs./ft.³ | Unconfined Compressive Strength, p.s.i. |
|---|---|---|---|
| 2% Phosphoric acid | 17.2 | 114.2 | 98 |
| Do | 15.5 | 118.2 | 133 |
| Do | 13.6 | 118.6 | 153 |
| Do | 11.9 | 115.9 | 161 |
| Do | 10.3 | 113.1 | 182 |
| Do | 8.2 | 111.0 | 168 |

It is noted from the above table that the dry density in pounds per cubic foot is increased slightly by the increased compaction, but that the unconfined compressive strength in p.s.i. is of the same order of magnitude as the sample shown in Examples 1, 2 and 4, e.g. wherein 2 percent phosphoric acid treated samples molded at the designated percent moisture content had the indicated unconfined compressive strengths: 17.8%, 98 p.s.i. and 15.3%, 127 p.s.i.; 15.6%, 131 p.s.i.; and 15.9%, 130 and 135 p.s.i.

The instant invention also affords a means of providing building blocks for the construction of earth buildings and the like such as are commonly erected in Asia, Africa and South America, and particularly in areas where soil is about the only locally available building material, as for example Egypt and Israel. The building blocks can be easily produced by unskilled labor in the undeveloped portions of these areas by mixing the proper ratio of clay soil, orthophosphoric acid, and water and compacting said mixture to approach the maximum density thereof. As indicated herein above the compacted treated soil has a high compressive strength even on immersion in water and will accordingly withstand rain and flood water without disintegrating as do the untreated materials.

The method of this invention may also be employed in the presence of various other soil additives, which may be present in minor amounts in the clay-containing soil or added thereto after the treatment thereof with the phosphoric acid. Thus, for example phosphoric acid can be added to various soil-cement mixtures or Portland cement may also be added to the phosphoric acid-clay mixture. Various other suitable combinations may also be employed.

I claim:

1. A method of effecting the stabilization of a clay soil having a plastic index of greater than about 15 and containing from about 10 to about 70 percent of clay comprising the addition thereto of from about 1 to about 5 weight percent of orthophosphoric acid, calculated as 100% $H_3PO_4$, based on the dry weight of said soil, effecting a substantially uniform distribution of the orthophosphoric acid in the said soil and thereafter compacting the treated soil to provide a stabilized soil characterized by substantially improved unconfined compressive strength over the untreated soil after immersion in water for at least two days.

2. The method of claim 1, wherein the orthophosphoric acid is wet-process phosphoric acid prepared by the wet-process reaction of sulfuric acid on phosphate rock.

3. The method of claim 1, wherein from about 2 to about 3 percent of orthophosphoric acid is employed and wherein the unconfined compressive strength of the stabilized soil so produced is at least about 100 pounds per square inch after immersion of the compacted soil in water for at least two days.

4. The method of claim 2, wherein from about 2 to about 3 percent of orthophosphoric acid is employed and wherein the unconfined compressive strength of the stabilized soil so produced is at least about 100 pounds per square inch after immersion of the compacted soil in water for at least two days.

5. A method of effecting the stabilization of a clay soil having a plastic index of greater than about 15 and containing from about 20 to about 50 percent of clay comprising the addition thereto of from about 1 to about 5 weight percent of orthophosphoric acid, calculated as 100% $H_3PO_4$, based on the dry weight of said soil, effecting a substantially uniform distribution of the orthophosphoric acid in the said soil and thereafter compacting the treated soil to provide a stabilized soil characterized by a substantially improved unconfined compressive strength over the untreated soil after immersion in water for at least two days.

6. The method of claim 5, wherein the orthophosphoric acid is wet-process phosphoric acid prepared by the wet-process reaction of spent sulfuric acid from alkylation plants on phosphate rock.

7. The method of claim 5, wherein from about 2 to about 3 percent of orthophosphoric acid is employed and wherein the unconfined compressive strength of the stabilized soil so produced is at least about 100 pounds per square inch after immersion of the compacted soil in water for at least two days.

8. The method of claim 6, wherein from about 2 to about 3 percent of orthophosphoric acid is employed and wherein the unconfined compressive strength of the stabilized soil so produced is at least about 100 pounds per square inch after immersion of the compacted soil in water for at least two days.

9. A composition of matter comprising a compacted composition of a clay-containing soil whose clay content is in the range of from about 10 to about 70 percent having substantially uniformly added thereto from about 1 to about 5 weight percent of orthophosphoric acid, calculated as 100% $H_3PO_4$, based on the dry weight of said soil.

10. The composition of matter of claim 9, wherein the soil contains from about 20 to about 50 percent of clay.

11. The composition of matter of claim 9, wherein the soil contains from about 30 to about 70 percent of clay.

References Cited in the file of this patent

UNITED STATES PATENTS

| | | |
|---|---|---|
| 2,369,682 | Miller | Feb. 20, 1945 |
| 2,508,924 | Mertens | May 23, 1950 |
| 2,550,371 | Naps | Apr. 24, 1951 |
| 2,652,360 | Bond et al. | Sept. 15, 1953 |
| 2,687,358 | Alberry et al. | Aug. 24, 1954 |

OTHER REFERENCES

Agricultural Chemicals 5, #5, 33–34 (1950), S583A3.
Lambe et al.: "Chem. Eng. News," 32, 488 (1954), 488–492, JP1J418.

UNITED STATES PATENT OFFICE
CERTIFICATE OF CORRECTION

Patent No. 2,899,329                                             August 11, 1959

John W. Lyons

It is hereby certified that error appears in the printed specification of the above numbered patent requiring correction and that the said Letters Patent should read as corrected below.

Column 3, lines 36 and 37, strike out "four-pound hammer falling through a vertical distance of twelve inches. After the first five blows on the first layer," and insert the same after "from the", in line 69, same column.

Signed and sealed this 26th day of January 1960.

(SEAL)

Attest:

KARL H. AXLINE                                                 ROBERT C. WATSON

Attesting Officer                                            Commissioner of Patents